OPTICAL INSTRUMENT FOR CHARACTER PRINT QUALITY ANALYSIS

Filed July 8, 1965

INVENTOR
Albert A. Sargent,
BY Watson, Cole, Grindle & Watson
ATTORNEYS

OPTICAL INSTRUMENT FOR CHARACTER PRINT QUALITY ANALYSIS

Filed July 8, 1965

INVENTOR

Albert A. Sargent,

BY Watson, Cole, Grindle, & Watson

ATTORNEYS

United States Patent Office
3,424,912
Patented Jan. 28, 1969

3,424,912

OPTICAL INSTRUMENT FOR CHARACTER PRINT QUALITY ANALYSIS

Albert A. Sargent, Grand Island, N.Y., assignor to Moore Business Forms, Inc., a corporation of New York Filed July 8, 1965, Ser. No. 470,502
U.S. Cl. 250—219 9 Claims
Int. Cl. G01n 21/48

ABSTRACT OF THE DISCLOSURE

An optical instrument for projecting characters from a platform aperture to a display screen and converting the radiant energy on the display screen to automatically indicate calibrated selected characteristics of the displayed area of the character. The optical projecting system projects the image on the display screen so that movement of the exposed document area thereon is in the same direction as the movement of the exposed area of the document at the platform position. The document illuminating source is directed at the aperture to reflect light therefrom at a selected specular angle and the projection system receives diffused light from the aperture at a significantly greater angle than the specular reflection angle.

This invention relates to an instrument for analyzing the print quality of a character reproduced upon a document, and more particularly it relates to an optical instrument which is used to display the reflectance qualities of the document as well as the print contrast characteristics of the printed text to measure response characteristics for indicating performance in optical character recognition equipment.

With the advent of equipment for reading characters optically for automatic entry into data processing systems, there has developed a need for equipment for analyzing the print quality of characters and documents which might be used in such automatic recognition systems.

Some of the factors which must be recognized in providing such equipment, since they bear upon the performance of optical character recognition systems, are the reflectance qualities of the paper, the print contrast signal for characters printed upon the paper, and various features of alignment of the character including character spacing, line spacings, heights and widths, together with uniformity of print within character boundary lines and calibration of performance in these various respects in accordance with standard signals which will afford repeatability from one measurement to the next.

It is therefore an object of the present invention to provide a comprehensive instrument for testing print quality of those features bearing upon performance of optical character recognition equipment.

It is a further object of the invention to provide print quality analysis instruments in which both visual inspection of the printed character may be made and in which proper reflectance and print contrast signals may be electronically measured at any selected position within or without the character boundaries.

Thus in accordance with the present invention there is provided a print quality analysis instrument which optically projects from a document exposure area of known size an enlarged image upon a visual display screen with a grating to permit alignment and measurements of overall character spacings and dimensions as well as line widths and to visually determine edge raggedness and print uniformity. The image display screen is provided with a sensor responsive to a specified selectable portion of the displayed image provide a signal to a meter for indicating either the reflectance from the paper or the print contrast signal on different calibrated scales.

A preferred embodiment of the invention together with further features and advantages related thereto are described in detail in the following specification with reference to the accompanying drawings, wherein.

Figure 1:
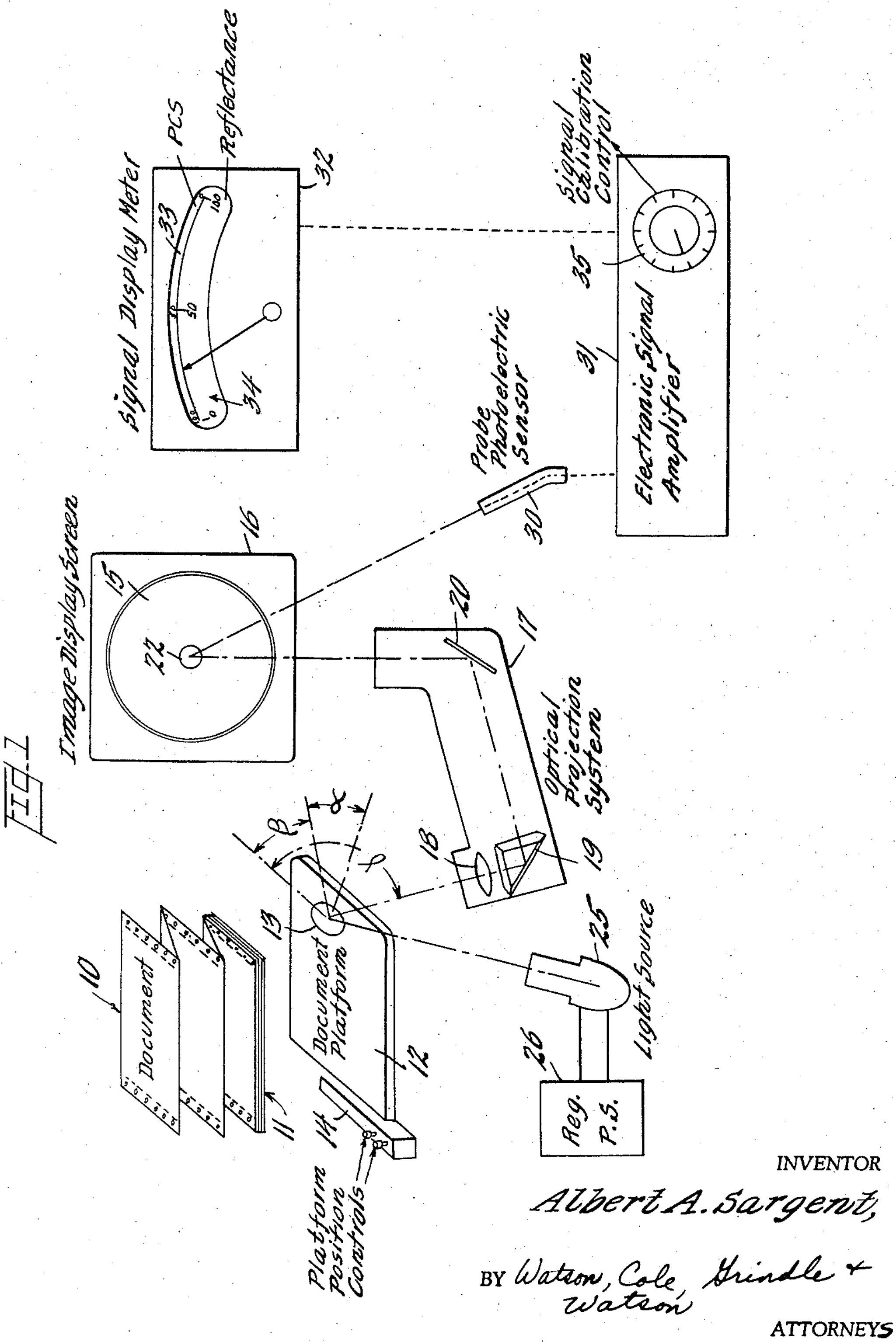
FIGURE 1 is a diagrammatic layout view of the test instrument system provided in accordance with the invention for analyzing print quality.

Now referring to the metering system of FIGURE 1 a document 10, which has produced thereon printed characters appearing on the bottom sheet 11, is positioned on a document platform 12 so that the character is registered above document exposure aperture 13. This aperture preferably has a diameter of one-quarter inch to form a document exposure area of pre-selected size as shown encompassing a character by the ring 21 of FIGURE 3. It is noted that the document 10 may be folded to provide a thick pad of paper over the exposure aperture 13. The number of folds should provide a backing of such thickness that a value of reflectance from the paper will not change when the thickness of the paper is doubled, in order to provide what is known as an infinite pad method of reflectance measurement.

Figure 2:
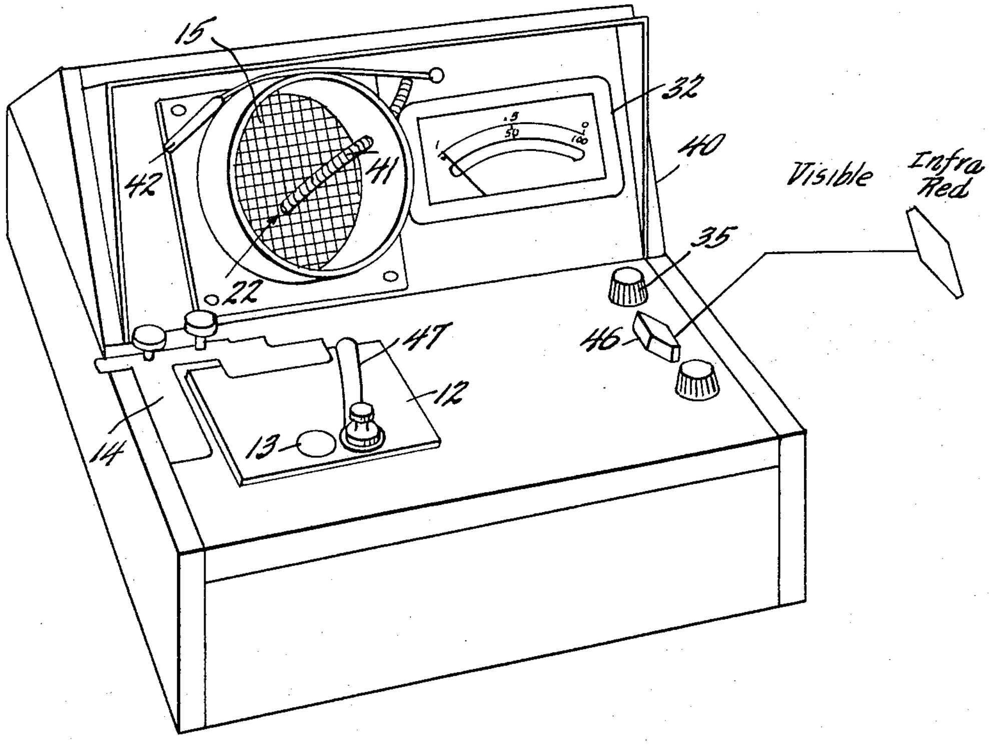
FIGURE 2 is a perspective view of a cabinet housing the instrument together with the various document adjusting means and controls thereon.

The platform 12 is provided with micrometer control means 14 better shown in FIGURE 2 for positioning the document in two dimensions relative to the aperture 13 with enough precision to align and measure the various dimensions of the characters on the grating of screen 15 of the optical display device 16, upon which the character is displayed in magnified form. Typically one-quarter inch exposed area is magnified 20 times by the optical projection system 17 to provide a display screen of five inches in diameter. Upon this screen area the characters may be positioned to determine line widths, character widths and heights, and line or character spacings.

Figure 3:
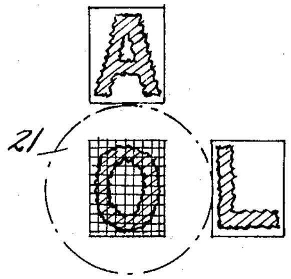
FIGURE 3 is a sketch of typical printed characters which may be analyzed in accordance with the teachings of the present invention.

Thus the optical projection system 17 has a lens system 18 which projects through the prism 19 and mirror 20 the image of the exposed area 13 in magnified form upon the viewing surface 16 so that the image display screen 15 can be used to carefully meter the dimensions of characters typically as shown in FIGURE 3 upon the grating of the screen. Thus it may be seen upon the phantom circle 21 of FIGURE 3 that the typical characters may be positioned within the viewing screen by means of the micrometer platform adjustment means 14 in order to align characters for ready matching of grating lines to determine character dimensions. Alternately the adjustments position different print areas within character lines in the probe area 22 to select a definite portion of the document area, typically a circular area with a diameter of 0.008 inch for electronic measurement. This therefore provides for the measurement of reflectance in print contrast qualities at any position within the character print region. Also uniformity measurements of reflectance may be taken at different positions to determine variations of reflectance for example, in areas where the paper might be dirty or smudged, and similarly, variations of print contrast can be determined throughout the character outline.

In order to provide proper metering of reflectance signals and print contrast signals, a light source 25 is provided which may be typically a tungsten lamp driven from a regulated power supply 26 to provide constant illumination of the document exposure area directed along a specular angle of reflectance with the planar surface of document exposure area 13 which may be identified by the angle beta ($\beta$). Images are optically taken at an angle gamma ($\gamma$) which comprises a diffused rather than specular reflection from the surface of the document at the document exposure area 13 wherein the diffused viewing angle gamma is greater than the specular angle beta by at least the angle alpha ($\alpha$) which is preferably greater than 10 degrees.

The photoelectric sensor probe 30 conveys that radiant energy from the calibrated response area 22 which is imaged on screen 15 into the electronic amplifier system 31, which may be, for example, an electronic volt meter that is calibrated to display an indication of the radiated light characteristics upon the scales of the accompanying meter face 32. An upper scale 33 is graduated for the print contrast reading and a lower reciprocal scale 34 is graduated for the reflectance readings. In order to calibrate the zero setting of the meter for appropriate readings a signal calibration control 35 is provided so that the meter may be zero set when a pre-selected chip, used to provide a standard for reflection of the light beam, is placed at the window 13. Thus reflectance may be gauged relative to the reflectance of a standard chip of magnesium oxide placed at the document exposure area 13. In this way absolute reflectance and print contrast can be read directly on the instrument meter 32 after adjustment by the signal calibration control 35.

This reading can be taken throughout the entire image display area by adjusting the relative positions of the probe 30 and the character portions by visual alignment within the display screen 15 while manipulating controls 14. Thus it is of considerable importance that the probe 30 is directed at that portion of the display screen visually monitored rather than being taken directly from the viewing area of the document platform 12, since in this manner there can be no question as to which portion of the character area is being monitored on the signal display meter 32.

In order to provide a calibration for both photoelectric response and infra-red response the radiant energy detectors and probes 30 can be varied. Thus as shown in FIGURE 2, the photoelectric sensor probe may be coupled within the instrument case 40 by means of an optical pipe comprising the bundle of fibers 41 which are located at position 22 upon the calibrated display screen 15. However an additional auxiliary infra-red probe 42 is provided with appropriate detectors and filters so that the reflectance and print contrast signal may be produced with heat response in the infra-red region of specular response. In this way the instrument can be fashioned to provide readings comparable to the characteristics of a corresponding optical character reading device which may have response either in the infra-red or the photoelectric regions of radiant energy reflected from a document provided from a source such as tungsten lamp 25. Since the electronic volt meter is calibrated differently for response from the two probes, a control knob 46 is provided to select the appropriate volt meter response in the visible and infra-red regions.

There is provided in addition a pressure pad 47 which may be placed over the document exposure aperture 13 in order to hold the document flat against the viewing window. Preferably this pressure pad is of a metallic characteristic with thermal conducting properties so that it performs as a heat sink to stabilize the temperature at the exposure window 13 as provided from the radiant energy of light source 25 impinging upon the window and the document placed thereat.

It may be noted that the print contrast signal may be defined as a reciprocal of the reflectance signal. Mathematically stated therefore the print contrast signal $$\text{PCS equals } 1-\frac{R_p}{R_{max}}$$

where $R_p$ is the reflectance of the calibrated area 22 and $R_{max}$ is the maximum reflectance from the paper surface that does not contain smudges or a printed character. It may be seen from this relationship that the reciprocal arrangements of the two scales on signal display meter 32 provides immediate reference to areas either within or without the printed character boundaries without requiring recalibration of the meter. This is important in taking the various measurements in the vicinity of the character as positioned within the image display screen area 15.

An operating feature of particular advantage in this instrument results in using a special inverting prism such as the Amici or Roof prism in the optical system at prism 19. This serves to cause the image on the display screen 15 to move in the same apparent direction as the original is moved on the document platform. It is apparent that this produces a natural and simplified mode of operation in combination with the other features of this invention. This type of prism is shown and described on pages 16 and 17 of "Fundamentals of Optics" by Jenkins and White, McGraw-Hill Book Company, New York.

It may be seen therefore that in accordance with the provisions of the present invention various qualities and measurements suitable for testing the print quality may be obtained in such a manner that response in automatic character recognition equipment can be determined without reference to extraneous tables or various instruments. This has resulted because of the characteristics of the instrument which permits not only the visual display of the character upon a calibrated display screen, but the provision to electronically meter the radiant energy displayed upon that screen as projected in enlarged form from an exposure area of predetermined dimensions at the printed document. Thus the document is movable so that a character can be placed in a calibrated position with precision to align the printed character relative to the calibration marks upon the image display screen and make readings therefrom more reliable. Having therefore provided this improved comprehensive optical test instrument, those features of novelty which are believed descriptive of the present invention and its nature are defined with particularity in the appended claims.

What is claimed is:

1. An instrument for analyzing character print quality, in combination, comprising:

platform means for holding a printed document to expose defined areas thereof, display means for presenting an image of the defined area of the printed document, projection means for projecting the image on the display means in such a manner that changes of document position at the platform means to expose defined areas thereof are displayed in the same apparent direction of movement on the display means, and sensor means for measuring characteristics of the image presented on the display means.

2. An instrument according to claim 1 wherein the platform means includes aperture means for exposing the defined area of the printed document and positioning means for moving the platform means to expose different areas of the printed document.

3. An instrument according to claim 2 wherein said aperture means has a diameter of eight-thousandths of an inch.

4. An instrument according to claim 2, wherein the projection means includes optical means for inverting the image to cause the image presented to the display means to move in the same direction as movements of the position of the document by the positioning means.

5. An instrument according to claim 4 wherein the projection means further includes a light source directed at the aperture means in such a manner that the light reflected therefrom is at a selected specular reflection angle therefrom, and the projection means are arranged to receive reflected light from the aperture means at a significantly greater angle than the specular reflection angle of the instant light rays thereon.

6. An instrument according to claim 5 wherein said significantly greater angle is greater than ten degrees.

7. An instrument according to claim 5, wherein the display means includes a graduated image display screen for receiving an enlarged image from the projection means, the sensor means comprises a radiant energy responsive probe for the reception of a specified portion of the radiant energy reflected from the projected image on the display means and, the sensor means further includes measuring means for determining the radiant energy received by the probe means for indicating the reflectant quality of the print characters which are exposed by the aperture means.

8. An instrument according to claim 7 wherein the radiant energy responsive probe means are in contact with the image display means and, the optical means in the projection means comprises a roof prism.

9. An instrument according to claim 8 wherein said radiant energy responsive probe means include means for detecting infra-red energy.

References Cited

UNITED STATES PATENTS

| | | | |
|---|---|---|---|
| 2,694,957 | 11/1954 | Mottu | 88—14 |
| 3,053,181 | 9/1962 | Jorgensen | 88—14 X |
| 3,104,372 | 9/1963 | Rabinow et al. | 250—219 |
| 3,216,317 | 11/1965 | Nail | 88—24 |
| 3,254,560 | 6/1966 | Gottesmann | 88—24 |
| 3,347,131 | 10/1967 | Clauer et al. | 250—219 |

RALPH G. NILSON, *Primary Examiner.*

M. A. LEAVITT, *Assistant Examiner.*

U.S. Cl. X.R.

88—14, 24.